United States Patent [19]

Fischer et al.

[11] Patent Number: 4,482,657

[45] Date of Patent: Nov. 13, 1984

[54] SILICA-POLYMER MIXTURES

[75] Inventors: Erhardt Fischer; Douglas C. Edwards, both of Sarnia, Canada

[73] Assignee: Polysar Limited, Sarnia, Canada

[21] Appl. No.: 513,089

[22] Filed: Jul. 12, 1983

[30] Foreign Application Priority Data

Sep. 1, 1982 [CA] Canada ............................ 410560

[51] Int. Cl.$^3$ .............................................. C08K 3/36
[52] U.S. Cl. .................................. 523/334; 524/186; 524/236
[58] Field of Search ................ 524/186, 236; 523/334

[56]  References Cited

U.S. PATENT DOCUMENTS 3,686,113  8/1972  Burke, Jr. ......................... 523/210
3,689,452  9/1972  Burke, Jr. ......................... 524/96

Primary Examiner—Herbert J. Lilling
Attorney, Agent, or Firm—Stevens, Davis, Miller & Mosher

[57] ABSTRACT

A process is provided for producing a silica-synthetic polymer mixture by mixing silica, water and an alkyl trimethylammonium halide, adding this mixture to a latex of the synthetic polymer, coagulating the mixture and recovering the silica-polymer mixture. Such mixtures may be used for the production of rubbery vulcanizates such as shoe soles, light colored shaped articles and the like.

8 Claims, No Drawings

SILICA-POLYMER MIXTURES

This invention is directed to a process for making a mixture of a synthetic polymer and silica by coagulation of a mixture of an aqueous dispersion of silica and a latex of synthetic polymer.

U.S. Pat. No. 2,616,860 teaches that emulsion polymers are mixed with an aqueous dispersion of hydrated silica containing a polyethylene polyamine and coagulated to obtain a polymer-silica mixture. U.S. Pat. No. 3,098,837 describes coagulation of a mixture of an aqueous dispersion of silica and a latex of a butadiene-2-methyl-5-vinyl pyridine polymer. German Pat. No. 1,188,797 teaches that filtration of coagulated mixtures of silica and styrene-butadiene polymers is improved if certain cationic emulsifiers, including quaternary alkylated ammonium halides, are added at the coagulation stage. U.S. Pat. No. 3,686,113 teaches that specially prepared never dry silica is treated with oleophilic quaternary ammonium compounds then mixed with an aqueous dispersion of an elastomer containing an anionic dispersing agent and coagulated by contact with specific coagulating agents. U.S. Pat. No. 3,689,452 teaches that specially prepared never dry silica is treated with an oleophilic quaternary ammonium compound then mixed with an organic solvent dispersion of an elastomer and a silica-elastomer mixture is recovered. In spite of the prior art in the field of making mixtures of synthetic polymers and silica, no commercial process is in existence for production of such mixtures. Further, losses of silica from many of the prior art processes are high and, to reduce such losses, special silica and/or special polymers have to be used.

I have now discovered a process for making mixtures of silica and synthetic polymer which process utilizes generally available silica and does not suffer from significant losses of silica.

According to my invention, there is provided a process for producing a silica-synthetic polymer mixture, which process comprises in combination the steps of:

(a) mixing (i) from about 7 to about 15 parts by weight of silica having an average particle size of from about 10 nm to about 100 nm with (ii) from about 84 to about 93 parts by weight of water and with (iii) from about 0.1 to about 1 part by weight of alkyl trimethylammonium bromide or chloride wherein the alkyl group contains from 8 to 20 carbon atoms, for a total of 100 parts by weight, such mixing being under conditions of low speed agitation, to form a dispersion of silica in water, (b) adding said dispersion of silica to a latex of a synthetic conjugated $C_4$–$C_6$ diolefin containing polymer under conditions of low speed agitation, the ratio of said dispersion of silica to said latex being such as to provide a weight ratio of silica to polymer of from about 25:100 to about 90:100, said latex containing from about 10 to about 30 weight percent of conjugated diolefin containing polymer, (c) adding the mixture from (b) to an agitated coagulation mixture maintained at a temperature of from about 50° to about 80° C., said coagulation mixture comprising one of a sodium chloride-sulphuric acid mixture maintained at a pH of from about 3 to about 4.5 or calcium chloride, (d) separating, recovering and drying the so coagulated silica-polymer mixture.

The polymers that I use in my invention are the synthetic conjugated $C_4$–$C_6$ diolefin containing polymers. Conjugated $C_4$–$C_6$ diolefins include butadiene, isoprene and dimethyl-butadiene. Conjugated $C_4$–$C_6$ diolefin containing polymers may be homopolymers of such diolefins, for example polybutadiene or polyisoprene and may be polymers containing such diolefins copolymerized with copolymerizable vinyl or vinylidene group containing monomers such as styrene, alphamethylstyrene, vinyl toluene, divinylbenzene, acrylonitrile, and methacrylonitrile. I prefer to use butadiene-styrene polymers wherein the styrene content is from about 15 to about 60 weight percent. I use the polymers in latex form and the latex may contain from about 10 to about 30 weight percent of polymer, preferably from about 20 to about 30 weight percent of polymer. The pH of the latex may be adjusted to about 10 to about 11 by the addition of dilute aqueous alkali solution. Such polymers in latex form may be made by the well known emulsion free radical polymerization procedures. The emulsifiers normally used in the preparation of butadiene-styrene polymers in latex form are the well known fatty acid or rosin acid based emulsifiers or mixtures thereof.

The silica that I use in my invention is selected from that well known in the art. The silica has an average particle size of from about 10 nm to about 100 nm and preferably is the hydrated or precipitated silica. Preferably the silica has an average particle size of from about 15 to 50 nm. In preparing the dispersion of silica in water, I mix from about 7 to about 15 parts by weight, preferably from about 8 to about 12 parts by weight of silica with the water. The amount of water that I use is from about 84 to about 93 parts by weight. The silica and water are mixed under conditions of low speed agitation. If the mixture is subjected to high speed and high shear agitation, my process will not operate because, when mixed with the polymer latex and then coagulated, the silica-polymer mixture will be in the form of very small particles which cannot readily be separated from the water.

To the silica-water mixture I also add alkyl trimethylammonium bromide or chloride. Such quaternary ammonium salts are well known. The alkyl group of the alkyl trimethylammonium bromide or chloride contains from 8 to 20 carbon atoms and includes octyl, decyl, dodecyl, tetradecyl, octadecyl and mixtures of quaternary ammonium salts containing different such alkyl groups, such as mixtures of dodecyl- and tetradecyl-trimethylammonium bromide or chloride and hexadecyl- and octadecyl-trimethylammonium bromide or chloride. I prefer to use quaternary ammonium chlorides, especially dodecyl-trimethylammonium chloride, the commercially available product is believed to contain about 10 weight percent of tetradecyltrimethylammonium chloride. The amount of such quaternary ammonium salts that I use is from about 0.1 to about 1 parts by weight added to the silica and water. Preferably I prefer to use sufficient quaternary ammonium salt to provide from about 1.5 to about 8 parts by weight, most preferably from about 2 to about 4 parts by weight, per 100 parts by weight of silica.

The silica, water and quaternary ammonium salt may be mixed at any temperature from about 10° up to about 40° C., preferably from about 15° to about 25° C., and the mixing may be for a time of from about 1 minute, sufficient to form a dispersion of silica in water, up to any time as necessary for storage of the dispersion before use. I prefer to use the dispersion within about 24 hours of preparation but it may be stored for up to about 7 days with low speed agitation.

Preferably, the pH of the dispersion of silica in water is adjusted to between about pH 7 and about pH 9.5, most preferably to pH 7 to 8.5, by the addition of dilute aqueous alkali such as sodium or potassium hydroxide. I prefer to adjust the pH at the time of or immediately following the mixing of the silica, water and quaternary ammonium salt. I have found that by maintaining the pH within the defined ranges, the dispersion of silica in water does not cause premature coagulation of the latex when added thereto.

The next step in my process is to mix the dispersion of silica in water with the latex. I have found that it is necessary to add the dispersion of silica in water to the latex. If the latex is added to the dispersion of silica, the polymer in the latex undergoes premature coagulation. The dispersion of silica is added to the latex and mixed therewith under conditions of low speed agitation. If high speed and high shear agitation is used, either premature coagulation or formation of very small particles of silica-polymer mixture will occur. The mixing may be at a temperature of from about 10° up to about 50° C., preferably from about 15° to about 40° C. and may be for a time of from about 1 minute up to about 24 hours, preferably from about 1 minute up to about 1 hour. The ratio of the dispersion of silica to latex is such as to provide a weight ratio of silica to polymer of from about 25:100 to about 90:100, preferably from about 30:100 to about 80:100 and most preferably from about 40:100 to about 70:100.

The mixture of the dispersion of silica and the latex is then coagulated by adding the mixture to a vessel containing an agitated coagulation mixture. The coagulation mixture is maintained at a temperature of from about 50° to about 80° C., and preferably at a temperature of from about 65° to about 75° C. The coagulation mixture comprises one of an aqueous solution of a sodium chloride-sulphuric acid mixture maintained at a pH of from about 3 to about 4.5, in which the sodium chloride may be present at a concentration of from about 2 to about 6 weight percent and the sulphuric acid may be present at a concentration suitable to maintain the pH at the desired level, or an aqueous solution of calcium chloride in which the calcium chloride may be present at a concentration of from about 0.3 to about 1 weight percent. Such coagulation may be a batch process or a continuous process.

The coagulated silica-polymer mixture is then separated from the aqueous phase, such as by filtration or passage over a mechanical separator, the separated mixture may be washed with water if desired, is recovered and dried, such as by passage through a hot air drier or an extruder-drier. The dry silica-polymer mixture is then packaged.

It is surprising that a silica-polymer mixture may be prepared by such a simple process and that the silica is effectively incorporated into the polymer, leaving essentially no silica in the water phase after the coagulation step and that the silica is not removable from the mixture by washing.

The silica-polymer mixtures of this invention may be used for the production of rubbery vulcanizates. It is well known in the art that mechanical mixing of silica and rubbery polymers is energy intensive: accordingly, the use of the silica-polymer mixtures may reduce the energy required to produce the rubbery vulcanizates. Rubbery vulcanizates include shoe soles, light colored shaped articles and fabric reinforced articles.

The following examples serve to illustrate the invention.

EXAMPLE 1

A solution of cetyltrimethylammonium bromide (CTAB) in water was prepared to contain 2 g in 100 ml of water. In one experiment, to a vessel containing 200 ml of water at a temperature of about 25° C. and 50 ml of the CTAB solution was added, with low speed stirring, 25 g of fine particle size silica (HiSil ®233) to yield a dispersion of silica in water. The silica dispersion was added, with low speed stirring, to a vessel containing 200 g of a styrene-butadiene polymer latex at a temperature of about 25° C. containing about 25.3 weight percent of polymer. The mixture was stable and showed no signs of separation into separate phases while still being stirred. The silica-polymer mixture was slowly added to an agitated coagulation mixture contained in a large vessel and simultaneously further coagulation mixture was added. The coagulation mixture contained about 4 weight percent of sodium chloride and about 0.5 weight percent of sulphuric acid in water, was maintained at about 66° C. by the addition of steam and had a pH of about 4. The coagulated silica-polymer separated readily from the water, the residual aqueous phase was clear and washing of the coagulated silica-polymer did not result in removal of any silica. The silica-polymer mixture was dried in a hot air drier and was found to be a uniform mixture.

In a second experiment, the procedure as above described was followed except that 25 ml of the CTAB solution was used instead of the 50 ml. The silica-polymer mixture was also found to be a uniform mixture with no free silica.

EXAMPLE 2

A 2 percent solution of dodecyltrimethylammonium chloride (DTAC) in water was prepared (the DTAC is believed to contain about 10 weight percent of tetradecyltrimethylammonium chloride). Duplicate quantities of silica dispersion were prepared by adding 25 ml of the DTAC solution to 200 ml of water at about 25° C. followed by addition of 25 g of silica while slowly stirring the aqueous phase. One quantity of the silica dispersion was slowly added to 220 g of a latex at about 25° C. containing about 22.7 weight percent of styrene-butadiene polymer, the latex being slowly stirred while the silica was being added. This mixture was coagulated by slow addition to 2 l of a 0.5 weight percent solution of calcium chloride in water maintained at 66° C. by addition of steam. The coagulated mixture was recovered and dried in a hot air drier to yield Sample 1. The other quantity of the silica dispersion was slowly added, with agitation, to 261 g of a latex containing about 19.2 weight percent of styrene-butadiene polymer. This mixture was coagulated by slow addition to 2 l of a 0.5 weight percent solution of calcium chloride in water maintained at 71° C. by addition of steam. The coagulated mixture was recovered and dried in a hot air drier to yield Sample 2. For both coagulations, the aqueous phase was clear, no free silica was detected and both Samples were uniform in appearance and contained no loose silica. Both Sample 1 and 2 were compounded in the recipes shown in Table 1 (amounts shown by weight) and vulcanized by heating at 160° C. for 30 minutes and had the vulcanizate properties shown in Table 1.

TABLE 1

| Experiment # | | 21 | 22 | 23 | 24 |
|---|---|---|---|---|---|
| Sample 1 | | 150 | 150 | — | — |
| Sample 2 | | — | — | 150 | 150 |
| Zinc oxide | | 2 | 2 | 2 | 2 |
| Stearic acid | | 1 | 1 | 1 | 1 |
| Sulphur | | 2 | 2 | 2 | 2 |
| 2 (Morpholinothio) benzothiazole | | 3 | 3 | 3 | 3 |
| Polyethylene glycol | | — | 2.5 | — | 2.5 |
| Di-aryl-p-phenylenediamine | | 1 | 1 | 1 | 1 |
| Vulcanize at 160° C. for 30 minutes. | | | | | |
| Tensile Strength | kg/cm$^2$ | 194 | 200 | 184 | 170 |
| Elongation | % | 870 | 620 | 580 | 540 |
| 100% Modulus | kg/cm$^2$ | 10 | 16 | 14 | 16 |
| 300% Modulus | kg/cm$^2$ | 18 | 38 | 38 | 50 |

Note: Both Sample 1 and 2 contain 100 parts of polymer and 50 parts of silica.

EXAMPLE 3

Four samples of silica-polymer mixture were prepared and evaluated.

A silica dispersion was prepared by slowly adding 216 g of silica to a mixture of 200 ml of a 2 percent solution of dodecyltrimethylammonium chloride in water and 1.6 l of water at about 25° C. The so-formed silica dispersion was agitated slowly before use, and then transferred to an addition means. 1760 g of a latex containing about 22.7 weight percent of styrene-butadiene polymer at about 25° C. was placed in a second addition means. The silica dispersion flowed from the addition means to meet and mix with the latex from the second addition means and the whole mixture then flowed into a coagulation vessel equipped with an agitator and containing 6 l of a 0.66 weight percent solution of calcium chloride in water maintained at 74° C. The coagulated mixture was recovered, washed and dried to yield Sample 3, containing about 50 parts of silica per 100 parts of polymer.

A silica dispersion was prepared by slowly adding 324 g of silica to a mixture of 300 ml of a 2 percent solution of dodecyltrimethylammonium chloride in water and 2.4 l of water at about 25° C. The so-formed silica dispersion was transferred to an addition means. 1760 g of the latex used above at about 25° C. was placed in a second addition means. The silica dispersion flowed from the addition means to meet and mix with the latex from the second addition means and the whole mixture then flowed into a coagulation vessel equipped with an agitator and containing 6 l of a 0.66 weight percent solution of calcium chloride in water maintained at 71° C. The coagulated mixture was recovered, washed and dried to yield Sample 4, containing about 75 parts of silica per 100 parts of polymer.

Sample 5 was prepared as for Sample 4 except that 27.5 g of silica was added to a mixture of 25 ml of a 2 percent solution of dodecyltrimethylammonium chloride and 200 ml of water at about 25° C., then added to 261 g of a latex containing about 19.1 weight percent of styrene-butadiene polymer and coagulated as above. Sample 5 contained about 55 parts of silica per 100 parts of polymer.

Sample 6 was prepared by the slow addition of 50 g of silica to a mixture of 50 ml of a 2 percent solution of dodecyltrimethylammonium chloride in water and 200 ml of water at about 25° C. The silica dispersion was added to 522 g of a latex at about 25° C. containing about 19.1 weight percent of styrene-butadiene polymer with slow agitation. No coagulation occurred of this mixture. The mixture was then slowly added to a coagulation vessel equipped with an agitator and containing 4 l of water containing 160 g of sodium chloride while also adding sufficient of a solution containing 4 weight percent of sodium chloride and 0.5 weight percent of sulphuric acid to maintain the pH at 4. The temperature was maintained at 71° C. The coagulated mixture was recovered, washed and dried to yield Sample 6, containing about 50 parts of silica per 100 parts of polymer.

Vulcanizates, prepared by a procedure similar to that of Example 2, possessed the expected high strength properties.

EXAMPLE 4

Three samples of silica-polymer mixture were prepared, in which the amount of silica was varied.

For the first sample, 17.5 g of silica was slowly added, with stirring, to a mixture of 17.5 ml of a 2 percent solution of DTAC and 140 ml of water at 25° C. The pH was adjusted to 7.2 by the addition of sodium hydroxide solution. 261 g of a latex at about 25° C. and containing 50 g of a styrene-butadiene polymer was adjusted to a pH of 10.5 by the addition of sodium hydroxide solution. The silica dispersion was slowly added to the latex and this mixture was added, with agitation, to a coagulation vessel containing 2 l of a coagulation solution containing 4% of sodium chloride and 0.5% of sulphuric acid maintained at 66° C. while additional coagulation solution was added to maintain the pH at 4. The coagulated silica-polymer mixture was recovered, washed and dried and found to be uniform in composition with no free silica easily removable. The aqueous phase from the coagulation vessel was found to be essentially clear and contained no free silica.

The second sample was prepared in a like manner, using 25 g of silica in a mixture of 25 ml of DTAC solution and 200 ml of water, the pH being adjusted to 7.5. As for the first sample, the silica-polymer mixture was uniform and contained no free silica and the coagulation vessel aqueous phase was essentially clear and contained no free silica.

The third sample was prepared in a like manner, using 35 g of silica in a mixture of 35 ml of DTAC solution and 280 ml of water, the pH being adjusted to 7.1. The silica-polymer mixture was uniform and contained no free silica and the coagulation vessel aqueous phase was clear and contained no free silica.

The first sample contained 35 parts of silica, the second sample contained 50 parts of silica and the third sample contained 70 parts of silica, per 100 parts of polymer.

EXAMPLE 5

A silica dispersion was prepared by slowly adding 25 g of silica to a mixture of 25 ml of 20% DTAC solution and 200 ml of water at about 25° C. The pH of 261 g of latex containing 50 g of styrene-butadiene polymer was adjusted to 11.0 by the addition of sodium hydroxide solution.

The latex was added to the silica dispersion. Coagulation occurred resulting in the formation of a jelly like mixture throughout the whole. This shows that the silica dispersion must be added to the latex.

EXAMPLE 6

A silica dispersion was prepared by slowly adding 25 g of silica to a mixture of 50 ml of 2% DTAC solution and 200 ml of water at 25° C. The silica dispersion was slowly added to and mixed with 240 g of a latex at 25° C. containing about 50 g of styrene-butadiene polymer and formed a stable mixture.

A coagulation mixture was prepared by mixing 2 l of water, 20 ml of a 2 weight percent solution of a water soluble polyamine compound (NALCO®107) and sufficient sulphuric acid to maintain the pH at 4. The coagulation mixture was heated to and maintained at 66° C. and the silica-polymer mixture was slowly added with agitation. Although coagulation occurred, there was considerable free silica left throughout the aqueous phase, showing that the water soluble polyamine compounds often used as coagulation aids do not work in the present invention.

What is claimed is:

1. A process for producing a silica-synthetic polymer mixture, which process comprises in combination the steps of:
   (a) mixing (i) from about 7 to about 15 parts by weight of silica having an average particle size of from about 10 nm to about 100 nm with (ii) from about 84 to about 93 parts by weight of water and with (iii) from about 0.1 to about 1 part by weight of alkyl trimethylammonium bromide or chloride wherein the alkyl group contains from 8 to 20 carbon atoms, for a total of 100 parts by weight, such mixing being under conditions of low speed agitation, to form a dispersion of silica in water,
   (b) adding said dispersion of silica to a latex of a synthetic conjugated $C_4$–$C_6$ diolefin containing polymer under conditions of low speed agitation, the ratio of said dispersion of silica to said latex being such as to provide a weight ratio of silica to polymer of from about 25:100 to about 90:100, said latex containing from about 10 to about 30 weight percent of conjugated diolefin containing polymer,
   (c) adding the mixture from (b) to an agitated coagulation mixture maintained at a temperature of from about 50° to about 80° C., said coagulation mixture comprising one of a sodium chloride-sulphuric acid mixture maintained at a pH of from about 3 to about 4.5 or calcium chloride,
   (d) separating, recovering and drying the so coagulated silica-polymer mixture.

2. The process of claim 1 wherein the amount of silica used in step (a) is from about 8 to about 12 parts by weight.

3. The process of claim 1 wherein the weight ratio of silica to polymer in step (b) is from about 30:100 to about 80:100.

4. The process of claim 2 wherein the amount of alkyl trimethylammonium bromide or chloride is sufficient to provide from about 2 to about 4 parts by weight per 100 parts by weight of silica.

5. The process of claim 1 wherein the mixing of step (a) is at a temperature of from about 10° to about 40° C.

6. The process of claim 1 wherein the pH of the dispersion of silica in water from step (a) is adjusted to a pH of from about 7 to about 9.5 by the addition of dilute aqueous alkali.

7. The process of claim 5 wherein the mixing of step (b) is at a temperature of from about 10° to about 50° C.

8. The process of claim 6 wherein the latex is adjusted to a pH of from about 10 to about 11 by the addition of dilute aqueous alkali.

* * * * *